(12) United States Patent
Martin et al.

(10) Patent No.: US 7,188,622 B2
(45) Date of Patent: Mar. 13, 2007

(54) FILTERING FACE MASK THAT HAS A RESILIENT SEAL SURFACE IN ITS EXHALATION VALVE

(75) Inventors: Philip G. Martin, Forest Lake, MN (US); Jianxian Xue, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 267 days.

(21) Appl. No.: 10/465,359

(22) Filed: Jun. 19, 2003

(65) Prior Publication Data

US 2004/0255947 A1 Dec. 23, 2004

(51) Int. Cl.
*A62B 23/02* (2006.01)
*A62B 9/02* (2006.01)
*A62B 9/06* (2006.01)

(52) U.S. Cl. .......................... 128/206.15; 128/207.12; 128/207.17; 128/205.24

(58) Field of Classification Search ........... 128/205.27, 128/205.29, 206.12, 206.15, 206.19, 207.12, 128/205.24, 207.17; 137/855, 856, 857, 137/858

See application file for complete search history.

(56) References Cited

U.S. PATENT DOCUMENTS

| | | | |
|---|---|---|---|
| 1,359,631 A | 11/1920 | Teed | |
| 2,051,023 A | 8/1936 | Bullard | |
| 2,072,516 A | 3/1937 | Ferenci et al. | |
| 2,230,770 A | 2/1941 | van Almelo | |
| 2,895,472 A | * 7/1959 | Matheson | 128/206.15 |
| 4,354,520 A | * 10/1982 | Easley, Jr. | 137/543.23 |
| 4,630,604 A | 12/1986 | Montesi | |
| 4,633,825 A | * 1/1987 | Flaig | 123/73 V |
| 4,934,362 A | 6/1990 | Braun | |
| 4,974,586 A | * 12/1990 | Wandel et al. | 128/206.28 |
| 4,981,134 A | * 1/1991 | Courtney | 128/207.12 |
| 5,247,912 A | * 9/1993 | Boyesen et al. | 123/65 V |

(Continued)

FOREIGN PATENT DOCUMENTS

EP 252890 A1 1/1988

(Continued)

*Primary Examiner*—Teena Mitchell
*Assistant Examiner*—Shumaya B. Ali
(74) *Attorney, Agent, or Firm*—Karl G. Hanson

(57) ABSTRACT

A filtering face mask 10 that has a mask body and a new exhalation valve 14. The mask body is adapted to fit at least over the nose and mouth of a person to help define an interior gas space when the mask is worn. The exhalation valve 14 permits fluid communication between the interior gas space and an exterior gas space. The exhalation valve 14 has a valve seat 20 and a flap 22. The valve seat 20 includes a resilient seal surface 24 and an orifice 30 through which exhaled air may pass to leave the interior gas space. The flap 22 is mounted to the valve seat 20 such that the flap 22 makes contact with the resilient seal surface 24 when the valve is in its closed position and such that the flap 22 can move away from the seal surface 24 in response to an exhalation to allow exhaled air to pass through the orifice 30 to ultimately enter the exterior gas space. A filtering face mask that utilizes an exhalation valve that has a resilient seal surface can enable the valve to open under substantially less pressure, which, in turn, may improve wearer comfort.

54 Claims, 3 Drawing Sheets

U.S. PATENT DOCUMENTS

| | | | |
|---|---|---|---|
| 5,325,892 A * | 7/1994 | Japuntich et al. ............ | 137/855 |
| 5,355,910 A * | 10/1994 | Gies et al. .................. | 138/858 |
| 5,373,867 A * | 12/1994 | Boyesen et al. ............ | 137/514 |
| 5,509,436 A | 4/1996 | Japuntich et al. | |
| 5,509,536 A * | 4/1996 | Mannes ...................... | 209/273 |
| 5,617,849 A * | 4/1997 | Springett et al. ...... | 128/206.24 |
| 5,687,767 A * | 11/1997 | Bowers ...................... | 137/855 |
| 5,967,183 A | 10/1999 | Detweiler et al. | |
| 6,047,698 A * | 4/2000 | Magidson et al. ..... | 128/207.12 |
| 6,125,849 A * | 10/2000 | Williams et al. ....... | 128/206.12 |
| RE37,974 E | 2/2003 | Bowers | |
| 7,013,895 B2 * | 3/2006 | Martin et al. .......... | 128/205.24 |
| 7,028,689 B2 * | 4/2006 | Martin et al. .......... | 128/205.24 |
| 2001/0002041 A1 | 5/2001 | Hayakawa et al. | |
| 2001/0007284 A1 | 7/2001 | French et al. | |
| 2001/0022194 A1 | 9/2001 | Davis et al. | |
| 2001/0029952 A1 | 10/2001 | Curran et al. | |
| 2001/0035220 A1 | 11/2001 | Russell | |
| 2001/0039156 A1 | 11/2001 | Sato | |
| 2002/0020721 A1 | 2/2002 | Bonningue et al. | |
| 2002/0030068 A1 | 3/2002 | Burt | |
| 2003/0084902 A1 | 5/2003 | Japuntich et al. | |

FOREIGN PATENT DOCUMENTS

| | | |
|---|---|---|
| GB | 1092378 | 11/1967 |
| GB | 2072516 A * | 10/1981 |
| GB | 2222778 A | 3/1990 |
| JP | 08332239 A * | 12/1996 |
| WO | WO 03/045503 A1 | 6/2003 |

* cited by examiner

-•- Non-resilient Seal Surface Valve
-○- Resilient Seal Surface Valve

▨ IVAP For Non-resilient Seal Surface Valve

▨ IVAP For Resilient Seal Surface Valve

FILTERING FACE MASK THAT HAS A RESILIENT SEAL SURFACE IN ITS EXHALATION VALVE

The present invention pertains to a filtering face mask that utilizes a new exhalation fluid valve to purge exhaled air from the mask interior. The valve has a resilient material on its valve seat to allow the valve flap to make good contact with the seal surface when the valve is in its closed position. The valve is particularly suitable for use on a filtering face mask because it can provide a good seal when closed and can also contribute to the rapid displacement of exhaled air from the mask interior during an exhalation.

BACKGROUND

Persons who work in polluted environments commonly wear filtering face masks to protect themselves from inhaling airborne contaminants. Filtering face masks typically have a fibrous or sorbent filter that is capable of removing particulate and/or gaseous contaminants from the air. When wearing a face mask in a contaminated environment, wearers are generally comforted with the knowledge that their health is being protected, but they are, however, contemporaneously discomforted by the warm, moist, exhaled air that accumulates around their face. The greater this facial discomfort is, the greater the chances are that wearers may temporarily remove the mask from their face to alleviate the unpleasant condition. To reduce the occurrence of such an event, manufacturers of filtering face masks often install an exhalation valve on the mask body to allow the warm, moist, exhaled air to be rapidly purged from the mask interior. The rapid removal of the exhaled air makes the mask interior cooler and hence makes the mask more comfortable to wear, which in turn benefits worker safety because mask wearers are less likely to remove the mask from their face to eliminate the hot, moist, environment that accumulates around their nose and mouth.

For many years, commercial respiratory masks have used "button-style" exhalation valves to purge exhaled air from mask interiors. The button-style valves have employed a thin circular flexible flap as the dynamic mechanical element that lets exhaled air escape from the mask interior. The flap is centrally mounted to a valve seat through a central post. Examples of button-style valves are shown, for example, in U.S. Pat. Nos. 2,072,516, 2,230,770, 2,895,472, and 4,630,604. When a person exhales, a circumferential portion of the flap is lifted from the seal surface of the valve seat to allow air to escape from the mask interior.

Button-style valves have represented an advance in the attempt to improve wearer comfort, but investigators have made other improvements, an example of which is shown in U.S. Pat. No. 4,934,362 to Braun. The valve described in this patent uses a parabolic valve seat and an elongated flexible flap. Like the button-style valve, the Braun valve also has a centrally-mounted flap and has a flap edge portion that lifts from a seal surface during an exhalation to allow the exhaled air to escape from the mask interior.

After the Braun development, another innovation was made in the exhalation valve art by Japuntich et al.—see U.S. Pat. Nos. 5,325,892 and 5,509,436. The Japuntich et al. valve uses a single flexible flap that is mounted off-center in cantilevered fashion to minimize the exhalation pressure that is required to open the valve. When the valve-opening pressure is minimized, less power is required to operate the valve, which means that the wearer does not need to work as hard to expel exhaled air from the mask interior when breathing. Other valves that have been introduced after the Japuntich et al. valve also have used a non-centrally mounted cantilevered flexible flap—see U.S. Pat. Nos. 5,687,767, 6,047,698, and RE 37,974E. Valves that have this kind of construction are sometimes referred to as "flapper-style" or "cantilevered" exhalation valves.

In yet another development, the exhalation valve has been provided with a flexible flap that includes first and second juxtaposed layers, where at least one of the layers is stiffer, or has a greater modulus of elasticity, than the other layer—see U.S. patent application Ser. No. 09/989,965 to Martin et al. In a preferred embodiment of this exhalation valve, the flap layer that is the softer, more flexible (less stiff) layer, which has the lower modulus of elasticity, is disposed on the portion of the flexible flap that makes contact with the valve seat's seal surface. The use of a more flexible layer in this location on the flap allows a better seal to occur between the flexible flap and the seal surface under neutral conditions, that is, when a wearer is neither inhaling nor exhaling. The use of the multilayered flap also can allow a thinner and more dynamic flexible flap to be used in some instances, which then can allow the valve to open easier under less pressure drop to enable warm, moist, exhaled air to escape from the mask interior under less exhalation pressure. Wearers therefore may be able to purge larger amounts of exhaled air from the interior gas space more rapidly without expending as much power, resulting in improved comfort to the mask wearer.

In known valve products, like the exhalation valves described above, the valve seat has consistently been described as having a seal surface material that is relatively rigid in construction. For example, in U.S. Pat. No. 4,934,362 to Braun and in U.S. Pat. No. 5,509,436 to Japuntich et al., the whole valve seat is described as being made from an injection molded plastic. Commercially available products, like the Ventex™ valve sold by Moldex-Metric Inc. have similarly used a rigid plastic to fashion the totality of the valve seat. Although known exhalation valve products have been successful at improving wearer comfort by encouraging exhaled air to leave the mask interior more easily, none of the known valve products have used a resilient seal surface on the valve seat, which, as described below, may provide further benefits towards improving valve performance and hence wearer comfort.

SUMMARY OF THE INVENTION

In brief summary, the present invention provides a filtering face mask that comprises: a) a mask body that is adapted to fit at least over the nose and mouth of a person to help define an interior gas space when worn; and b) an exhalation valve that is secured to the mask body and that permits fluid communication between the interior gas space and an exterior gas space. The exhalation valve includes: (i) a valve seat that comprises a resilient seal surface and an orifice through which exhaled air may pass to leave the interior gas space; and (ii) a flap that is mounted to the valve seat such that the flap makes contact with the resilient seal surface when the valve is in its closed position and such that the flap can move away from the seal surface in response to an exhalation to allow exhaled air to pass through the orifice to ultimately enter the exterior gas space.

The present invention also provides a new unidirectional fluid valve that includes a flap and a valve seat. The flap is capable of moving from a closed position to an open position in direct response to a force from a fluid and is capable of moving from the open position back to the closed position when the force subsides. The valve seat, onto which the flap is positioned, has (i) an orifice through which the fluid passes when the valve is in the open position, and (ii) a resilient seal surface onto which the flap makes contact when the valve is in the closed position.

The filtering face mask of the present invention differs from known respiratory masks by providing its exhalation valve with a resilient seal surface onto which the valve flap makes contact when a wearer is neither inhaling nor exhaling. Use of the resilient seal surface on the valve seat of the exhalation valve can enable a more rigid, yet thinner flap to be employed in the valve. Use of such a flap can allow the valve to open under substantially less force or pressure. And since the force that is required to open the valve is generated by the wearer's breathing, the wearer does not need to breathe as hard to operate the valve. Less work is therefore needed to operate the valve when the mask is been worn. Consequently, use of a resilient seal surface can be beneficial to a wearer of a filtering face mask in that it can make the mask more comfortable to wear, particularly when it is being worn for extended time periods. When comfort is improved, there is less likelihood that the wearer will displace mask from their face in a contaminated environment. Filtering face masks of the present invention may accordingly improve wearer safety.

GLOSSARY

The terms used to describe this invention have the following meanings:

"clean air" means a volume of air or oxygen that has been filtered to remove contaminants or that otherwise has been made safe to breathe;

"closed position" means the position where the flexible flap is in essentially full contact with the seal surface;

"contaminants" mean particles and/or other substances that generally may not be considered to be particles (e.g., organic vapors, et cetera) but may be suspended in air;

"exhaled air" is air that is exhaled by a filtering face mask wearer;

"exhale flow stream" means the stream of air that passes through an orifice of an exhalation valve during an exhalation;

"exhalation valve" means a valve that opens to allow a fluid to exit the interior gas space of a filtering face mask;

"exterior gas space" means the ambient atmospheric gas space into which exhaled gas enters after passing through and beyond the exhalation valve;

"filtering face mask" means a respiratory protection device (including half and full face masks and hoods) that covers at least the nose and mouth of a wearer and that is capable of supplying clean air to a wearer;

"flap" means a dynamic element that changes position in response to a force from a moving fluid such as air from an exhale flow stream;

"flexible flap" means a sheet-like article that is capable of bending or flexing in response to a force exerted from a moving fluid, which moving fluid, in the case of an exhalation valve, would be an exhale flow stream and in the case of an inhalation valve would be an inhale flow stream;

"inhale filter element" means a fluid-permeable structure through which air passes before being inhaled by a wearer of a filtering face mask so that contaminants and/or particles can be removed therefrom;

"inhale flow stream" means the stream of air or oxygen that passes through an orifice of an inhalation valve during an inhalation;

"inhalation valve" means a valve that opens to allow a fluid to enter a filtering face mask's interior gas space;

"interior gas space" means the space between a mask body and a person's face;

"mask body" means a structure that can fit at least over the nose and mouth of a person and that helps define an interior gas space separated from an exterior gas space;

"particles" mean any liquid and/or solid substance that is capable of being suspended in air, for example, pathogens, bacteria, viruses, mucous, saliva, blood, etc.;

"resilient" means being able to recover if deformed in response to a force from a flap and having a hardness of less than about 0.02 Giga Pascals (GPa);

"seal surface" means a surface that makes contact with the flap when the valve is in its closed position;

"stiff or stiffness" means the flap's ability to resist deflection when supported horizontally as a cantilever by itself and exposed to gravity. A stiffer flap does not deflect as easily in response to gravity or other forces as a flap that is not as stiff;

"unidirectional fluid valve" means a valve that is designed to allow a fluid to pass through it in one direction but not the other.

DETAILED DESCRIPTION OF PREFERRED EMBODIMENTS

In the practice of the present invention, a new filtering face mask is provided that may improve wearer comfort and concomitantly make it more likely that users will continuously wear their masks in contaminated environments. The present invention thus may improve worker safety and provide long term health benefits to workers and others who wear personal respiratory protection devices.

Figure 1:
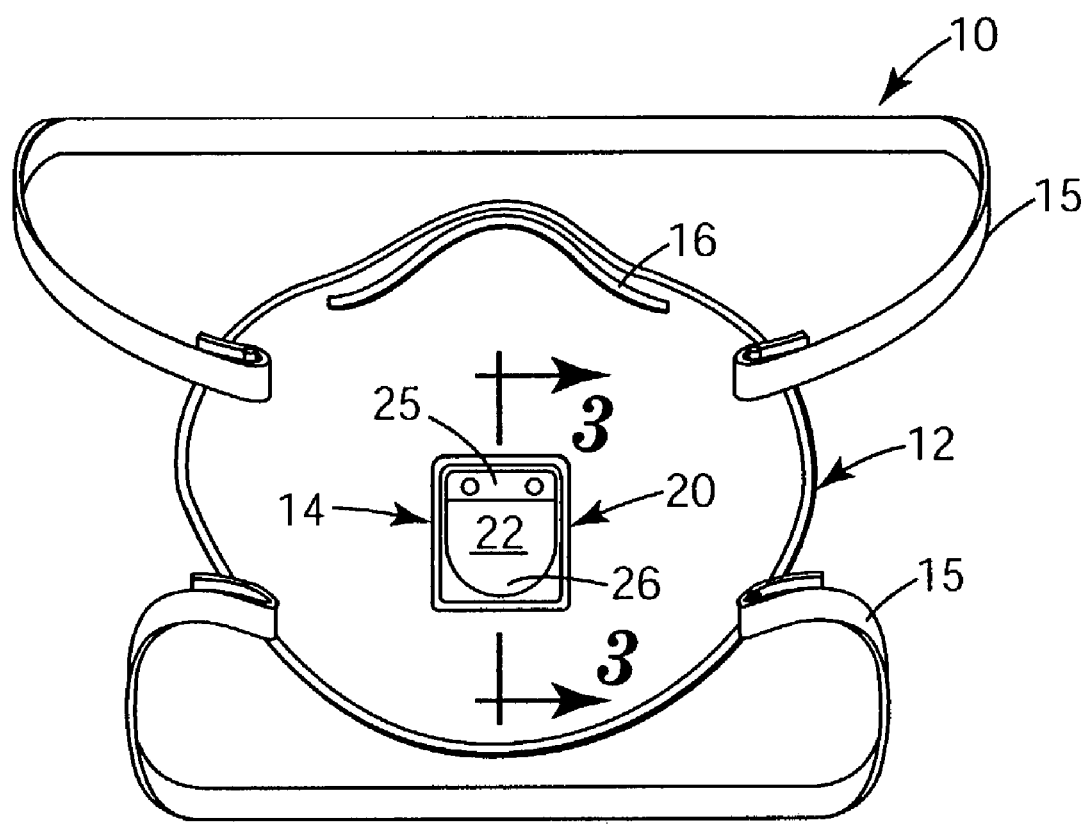
FIG. 1 is a front view of a filtering face mask 10 that may be used in connection with the present invention.

FIG. 1 illustrates an example of a filtering face mask 10 that may be used in conjunction with the present invention. Filtering face mask 10 is a half mask (because it covers the nose and mouth but not the eyes) that has a cup-shaped mask body 12 onto which an exhalation valve 14 is attached. The exhalation valve can be secured to the mask body using a variety of techniques such as ultrasonic welding, gluing, adhesively bonding (see U.S. Pat. No. 6,125,849 to Williams et al.), or mechanical clamping (see U.S. Patent Application 2001/0029952A1). The exhalation valve 14 opens in response to increased pressure inside the mask 10, which increased pressure occurs when a wearer exhales. The exhalation valve 14 preferably remains closed between breaths and during an inhalation. The valve 14 has a valve seat 20 onto which a flap 22 is secured at stationary portion 25. The flap 22 can be a flexible flap that has a free portion 26 that lifts from the valve seat 20 during an exhalation. When the free portion 26 is not in contact with the valve seat 20, exhaled air may pass from the interior gas space to an exterior gas space. The exhaled air may pass directly into the exterior gas space, or it may take a more tortuous path if, for example, the mask also includes an impactor element (see U.S. Pat. No. 6,460,539 B1 to Japuntich et al.) or it includes a filtered exhalation valve (see U.S. Patent Applications 2003/0005934A1 and U.S. Patent Application 2002/0023651A1 to Japuntich et al.).

Mask body 12 is adapted to fit over the nose and mouth of a person in spaced relation to the wearer's face to create an interior gas space or void between the wearer's face and the interior surface of the mask body. A nose clip 16 that comprises a pliable dead soft band of metal such as aluminum can be placed on mask body 12 to allow it to be shaped to hold the face mask in a desired fitting relationship over the nose of the wearer and where the nose meets the cheek. An example of a suitable nose clip is shown in U.S. Pat. Nos. 5,558,089 and Des. 412,573 to Castiglione. The illustrated mask body 12 is fluid permeable and typically is provided with an opening (not shown) that is located where the exhalation valve 14 is attached to the mask body 12 so that exhaled air can exit the interior gas space through the valve 14 without having to pass through the mask body itself. The preferred location of the opening on the mask body 12 is directly in front of where the wearer's mouth would be when the mask is being worn. The placement of the opening, and hence the exhalation valve 14, at this location allows the valve to open more easily in response to the force or momentum from the exhale flow stream. For a mask body 12 of the type shown in FIG. 1, essentially the entire exposed surface of mask body 12 is fluid permeable to inhaled air. To hold the face mask snugly upon the wearer's face, mask body can have a harness such as straps 15, tie strings, or any other suitable means attached to it for supporting the mask on the wearer's face. Examples of mask harnesses that may be used in connection with the present invention are shown in U.S. Pat. Nos. 6,457,473B1, 6,062,221, and 5,394,568, and to Brostrom et al., U.S. Pat. No. 6,332,465B1 to Xue et al., U.S. Pat. Nos. 6,119,692 and 5,464,010 to Byram, and U.S. Pat. Nos. 6,095,143 and 5,819,731 to Dyrud et al.

Mask body 12 can have a curved, hemispherical shape as shown in FIG. 1 (see also U.S. Pat. No. 4,807,619 to Dyrud et al.), or it may take on other shapes as so desired. For example, the mask body can be a cup-shaped mask having a construction like the face mask disclosed in U.S. Pat. No. 4,827,924 to Japuntich. The mask also could have the three-fold configuration that can fold flat when not in use but can open into a cup-shaped configuration when worn—see U.S. Pat. Nos. 6,484,722B2 and 6,123,077 to Bostock et al., and U.S. Design Pat. Nos. Des. 431,647 to Henderson et al., and Des. 424,688 to Bryant et al. Face masks of the invention also may take on many other configurations, such as flat bifold masks disclosed in U.S. Design Pat. Nos. Des. 448,472S and Des. 443,927S to Chen. The mask body also could be fluid impermeable and could have filter cartridges attached to it like, for example, the masks shown in U.S. Pat. No. 6,277,178B1 to Holmquist-Brown et al. or in U.S. Pat. No. 5,062,421 to Burns and Reischel. In addition, the mask body also could be adapted for use with a positive pressure air intake as opposed to the negative pressure masks just mentioned. Examples of positive pressure masks are shown in U.S. Pat. No. 6,186,140 B1 to Hoague, U.S. Pat. No. 5,924,420 to Grannis et al., and U.S. Pat. No. 4,790,306 to Braun et al. These masks may be connected to a powered air purifying respirator body that would be worn around the waist of the user—see, e.g., U.S. Design Pat. No. D464,725 to Petherbridge et al. The mask body of the filtering face mask also could be connected to a self-contained breathing apparatus, which may supply clean air to the wearer as disclosed, for example, in U.S. Pat. Nos. 5,035,239 and 4,971,052. The mask body may be configured to cover not only the nose and mouth of a wearer (referred to as a "half mask") but may also cover the eyes as well (referred to as a "full face mask") to provide protection to a wearer's vision in addition to the wearer's respiratory system—see, for example, U.S. Pat. No. 5,924,420 to Reischel et al.

The mask body may be spaced from the wearer's face, or it may reside flush or in close proximity to it. In either instance, the mask helps define an interior gas space into which exhaled air passes before leaving the mask interior through the exhalation valve. The mask body also could have a thermochromic fit-indicating seal at its periphery to allow the wearer to easily ascertain if a proper fit has been established—see U.S. Pat. No. 5,617,849 to Springett et al.

Figure 2:
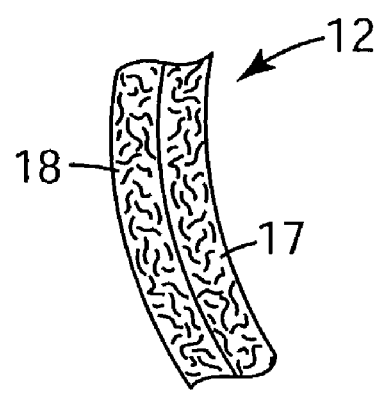
FIG. 2 is a partial cross section of the mask body 12 in FIG. 1.

FIG. 2 shows that the mask body 12 may comprise multiple layers such as an inner shaping layer 17 and an outer filtration layer 18. The shaping layer 17 provides structure to the mask body 12 and support for the filtration layer 18. The shaping layer 17 may be located on the inside and/or outside of filtration layer 18 (or on both sides) and can be made, for example, from a nonwoven web of thermally-bondable fibers, molded into a cup-shaped configuration—see U.S. Pat. No. 4,807,619 to Dyrud et al. and U.S. Pat. No. 4,536,440 to Berg. It can also be made from a porous layer or an open work "fishnet" type network of flexible plastic, like the shaping layer disclosed in U.S. Pat. No. 4,850,347 to Skov. The shaping layer can be molded in accordance with known procedures such as those described in Skov or in U.S. Pat. No. 5,307,796 to Kronzer et al. Although a shaping layer 17 is designed with the primary purpose of providing structure to the mask and providing support for a filtration layer, shaping layer 17 also may act as a filter, typically for capturing larger particles. Together layers 17 and 18 may operate as an inhale filter element.

The filtration layer optionally could be corrugated as described in U.S. Pat. Nos. 5,804,295 and 5,763,078 to Braun. And the mask body 12 may also include inner and/or outer cover webs (not shown) that can protect the filter layer 18 from abrasive forces and that can retain any fibers that may come loose from the filter layer 18 and/or shaping layer 17. The cover webs also may have filtering abilities, although typically not nearly as good as the filtering layer 18 and/or may serve to make the mask more comfortable to wear. The cover webs may be made from nonwoven fibrous materials such as spun bonded fibers that contain, for example, polyolefins, and polyesters—see, for example, U.S. Pat. Nos. 6,041,782 to Angadjivand et al., U.S. Pat. No. 4,807,619 to Dyrud et al., and U.S. Pat. No. 4,536,440 to Berg.

When a wearer inhales, air is drawn through the mask body, and airborne particles become trapped in the interstices between the fibers, particularly the fibers in the filter layer 18. In the embodiment shown in FIG. 2, the filter layer 18 is integral with the mask body 12—that is, it forms part of the mask body and is not an item that subsequently becomes attached to (or removed from) the mask body like a filter cartridge.

Filtering materials that are commonplace on negative pressure half mask respirators—like the mask 10 shown in FIG. 1—often contain an entangled web of electrically charged microfibers, particularly meltblown microfibers (BMF). Microfibers typically have an average effective fiber diameter of about 20 micrometers (μm) or less, but commonly are about 1 to about 15 μm, and still more commonly be about 3 to 10 μm in diameter. Effective fiber diameter may be calculated as described in Davies, C. N., *The Separation of Airborne Dust and Particles*, Institution of Mechanical Engineers, London, Proceedings 1B. 1952. BMF webs can be formed as described in Wente, Van A., *Superfine Thermoplastic Fibers* in Industrial Engineering Chemistry, vol. 48, pages 1342 et seq. (1956) or in Report No. 4364 of the Naval Research Laboratories, published May 25, 1954, entitled *Manufacture of Superfine Organic Fibers* by Wente, Van A., Boone, C. D., and Fluharty, E. L. Meltblown fibrous webs can be uniformly prepared and may contain multiple layers, like the webs described in U.S. Pat. No. 6,492,286B1 and 6,139,308 to Berrigan et al. When randomly entangled in a web, BMF webs can have sufficient integrity to be handled as a mat. Electric charge can be imparted to fibrous webs using techniques described in, for example, U.S. Pat. Nos. 6,454,986B1 and 6,406,657B1 to Eitzman et al.; U.S. Pat. Nos. 6,375,886B1, 6,119,691 and 5,496,507 to Angadjivand et al., U.S. Pat. No. 4,215,682 to Kubik et al., and U.S. Pat. No. 4,592,815 to Nakao.

Examples of fibrous materials that may be used as filters in a mask body are disclosed in U.S. Pat. No. 5,706,804 to Baumann et al., U.S. Pat. No. 4,419,993 to Peterson, U.S. Reissue Pat. No. Re 28,102 to Mayhew, U.S. Pat. Nos. 5,472,481 and 5,411,576 to Jones et al., and U.S. Pat. No. 5,908,598 to Rousseau et al. The fibers may contain polymers such as polypropylene and/or poly-4-methyl-1-pentene (see U.S. Pat. Nos. 4,874,399 to Jones et al. and U.S. Pat. No. 6,057,256 to Dyrud et al.) and may also contain fluorine atoms and/or other additives to enhance filtration performance—see, U.S. Pat. Nos. 6,432,175B1, 6,409,806B1, 6,398,847B1, 6,397,458B1 to Jones et al. and U.S. Pat. Nos. 5,025,052 and 5,099,026 to Crater et al., and may also have low levels of extractable hydrocarbons to improve performance—see U.S. Pat. No. 6,213,122 to Rousseau et al. Fibrous webs also may be fabricated to have increased oily mist resistance as described in U.S. Pat. No. 4,874,399 to Reed et al., and in U.S. Pat. Nos. 6,238,466 and 6,068,799, both to Rousseau et al.

Figure 3:
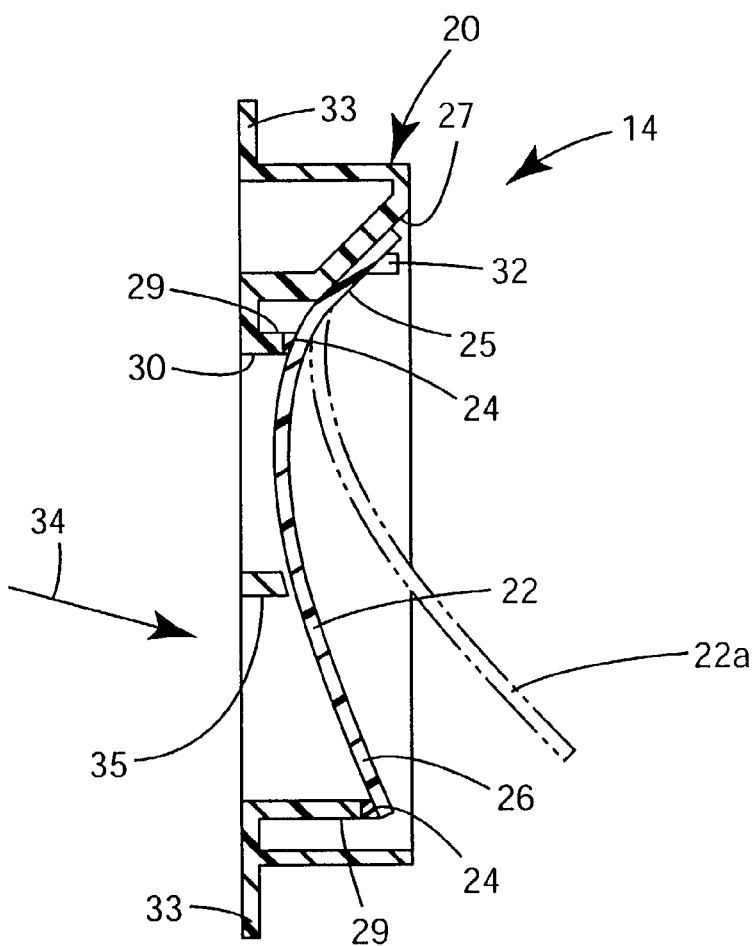
FIG. 3 is a cross-sectional view of an exhalation valve 14, taken along lines 3—3 of FIG. 1.

FIG. 3 shows that the flexible flap 22 rests on a seal surface 24 when the flap is closed and is secured at its stationary portion 25 to the valve seat 20. The flap 22 has a free end 26 that lifts from the resilient seal surface 24 when sufficient pressure is reached in the interior gas space during an exhalation. Flexible flap 22 is supported in cantilevered fashion to the valve seat 20 at a flap-retaining surface 27, which surface 27 is disposed non-centrally relative to the orifice 30. The seal surface 24 can be configured to curve generally in the longitudinal dimension when viewed from a side elevation in cross-section and may be non-aligned and relatively positioned with respect to a flap-retaining surface 27 to allow the flap to be biased or pressed towards the seal surface under neutral conditions—that is, when a wearer is neither inhaling or exhaling. As shown, the resilient seal surface 24 may be positioned at the extreme end of a seal ridge 29. The flap can also have (or alternatively may have) a transverse curvature imparted to it as described in U.S. Pat. No. 5,687,767, reissued as RE37,974 E to Bowers.

When a wearer of a filtering face mask 10 exhales, the exhaled air commonly passes through both the mask body and the exhalation valve 14. Comfort is best obtained when the greatest percentage of the exhaled air rapidly passes through the exhalation valve 14, as opposed to the filter media and/or shaping and cover layers in the mask body. Exhaled air is expelled from the interior gas space through an orifice 30 in valve 14 by having the exhaled air lift the flexible flap 22 from the seal surface 24. The circumferential or peripheral edge of flap 22, which is associated with a fixed or stationary portion 25, remains essentially stationary during an exhalation, while the remaining free circumferential edge of flexible flap 22 is lifted from valve seat 20 during an exhalation.

The flexible flap 22 is secured, at the stationary portion 25, to the valve seat 20 on the flap retaining surface 27, and can have pins 32 to help mount and position the flap 22 on the valve seat 20. Flexible flap 22 can be secured to the surface 27 using ultrasonic welding, an adhesive, mechanical clamping, and the like. The valve seat 20 also has a flange 33 that extends laterally from the valve seat 20 at its base to provide a surface that allows the exhalation valve 14 to be more properly affixed to the mask body 12.

FIG. 3 shows the flexible flap 22 in a closed position, resting on seal surface 24, and in an open position, lifted away from surface 24 as represented by dotted line 22*a*. A fluid passes through the valve 14 in the general direction indicated by arrow 34. If valve 14 is used on a filtering face mask to purge exhaled air from the mask interior, fluid flow 34 would represent an exhale flow stream. If valve 14 was used as an inhalation valve, flow stream 34 would represent an inhale flow stream. The fluid that passes through orifice 30 exerts a force on the flexible flap 22 (or transfers its momentum to it), causing the free portion 26 of flap 22 to be lifted from seal surface 24 to make the valve 14 open. When valve 14 is used as an exhalation valve, the valve is preferably oriented on face mask 10 such that the free portion 26 of flexible flap 22 is located below the stationary portion 25 when the mask 10 is positioned upright as shown in FIG. 1. This enables exhaled air to be deflected downwards to prevent moisture from condensing on the wearer's eyewear.

Figure 4:
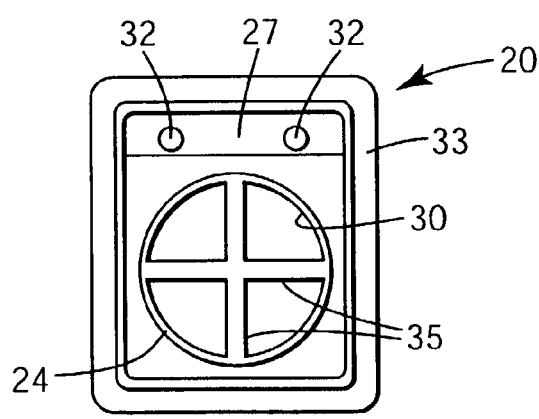
FIG. 4 is a front view of a valve seat 20 that may be used in conjunction with the present invention.

FIG. 4 shows the valve seat 20 from a front view without a flap being attached to it. The valve orifice 30 is disposed radially inward from the seal surface 24 and can have cross members 35 that stabilize the seal surface 24 and ultimately the valve 14. The cross members 35 also can prevent flexible flap 22 (FIG. 3) from inverting into the orifice 30 during an inhalation. Moisture build-up on the cross members 35 can hamper the opening of the flap 22. Therefore, the surfaces of the cross-members 35 that face the flap preferably are slightly recessed beneath the seal surface 24, but they may be flush with the seal surface when viewed from a side elevation to avoid hampering valve opening.

The seal surface 24 circumscribes or surrounds the orifice 30 to preclude passage of contaminates through the orifice when the valve is closed. Seal surface 24 and the valve orifice 30 can take on essentially any shape when viewed from the front. For example, the seal surface 24 and the orifice 30 may be square, rectangular, circular, elliptical, etc. The shape of seal surface 24 does not have to correspond to the shape of orifice 30 or vise versa. For example, the orifice 30 may be circular and the seal surface 24 may be rectangular. The seal surface 24 and orifice 30, however, preferably have a circular cross-section when viewed against the direction of fluid flow. Seal surfaces that are used in conjunction with valves in filtering face masks of the present invention have a resilient character—that is, they recover if deformed during use and have a hardness of less than about 0.02 GPa. Preferably the seal surfaces that are used in connection with the present invention have a hardness of less than 0.015 GPa, and more preferably have a hardness less than 0.013 GPa, and still more preferably, have a hardness of less than 0.01 GPa. More preferred seal surfaces may have a hardness of 0.006 to 0.001 GPa. The hardness could still be less than 0.001 GPa, provided the surface recovers when deformed. The hardness may be determined in accordance with the Nanoindentation Technique set forth below. The resilient seal surface may be secured to the valve seat using essentially any technique suitable for doing so, such as adhering, bonding, welding, frictionally engaging, etc. Alternatively, the whole valve seat could be fashioned as an "integral" resilient part, that is, it may be fashioned as a single unit and not two separate parts that were subsequently joined together. The seal surface may be in the form of a coating, a film, a ring such as an O-ring, or a foam such as a cellular, closed cell foam.

The majority of the valve seat 20, however, typically would be made from a relatively lightweight plastic that is molded into an integral one-piece body using, for example, injection molding techniques and the resilient seal surface would be joined to it. The seal surface 24 that makes contact with the flexible flap 22 is preferably fashioned to be substantially uniformly smooth to ensure that a good seal occurs. The seal surface 24 may reside on the top of a seal ridge 29 or it may be in planar alignment with the valve seat itself. The contact area of the seal surface 24 preferably has a width great enough to form a seal with the flexible flap 22 but is not so wide as to allow adhesive forces—caused by condensed moisture or expelled saliva—make the flexible flap 22 significantly more difficult to open. The contact area of the seal surface preferably is curved in a concave manner where the flap makes contact with the seal surface to facilitate contact of the flap to the seal surface around the whole perimeter of the seal surface. The valve 14 and its valve seat 20, without the resilient seal surface, are more fully described in U.S. Pat. Nos. 5,509,436 and 5,325,892 to Japuntich et al.

Figure 5:
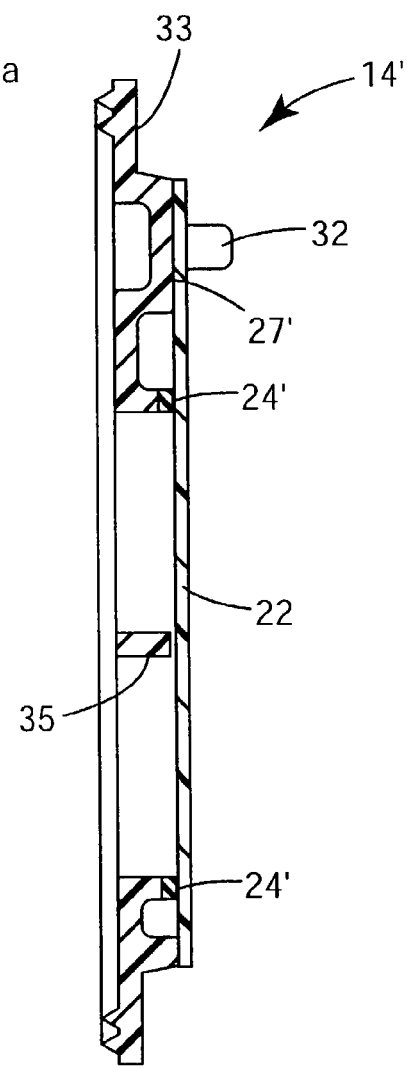
FIG. 5 is a side view of an alternative embodiment of an exhalation valve 14' that may be used on a filtering face mask in accordance with the present invention.

FIG. 5 shows another embodiment of an exhalation valve 14'. Unlike the embodiment shown in FIG. 3, this exhalation valve has, when viewed from a side elevation, a planar seal surface 24' that is in alignment with the flap-retaining surface 27'. The flap shown in FIG. 5 thus is not pressed towards or against the seal surface 24' by virtue of any mechanical force or internal stress that is placed on the flexible flap 22. Because the flap 22 is not preloaded or biased towards the seal surface 24' under "neutral conditions"—that is, when no fluid is passing through the valve and the flap is not otherwise subjected to external forces other than gravity—the flap 22 can open more easily during an exhalation. When using a resilient seal surface in accordance with the present invention, it may not be necessary to have the flap biased or forced into contact with the seal surface 24'—although such a construction may be desired in some instances. The invention thus may allow for the use of a flexible flap that is stiffer than flaps on known commercial products. The flap may be so stiff that it does not significantly droop away from the seal surface 24' in an unbiased condition when the force of gravity is per se exerted upon the flap and the valve is oriented such that the flap is disposed below the seal surface. The exhalation valve 14' shown in FIG. 5 therefore can be fashioned so that the flap 22 makes good contact with the seal surface under any orientation, including when a wearer bends their head downward towards the floor, without having the flap biased (or substantially biased) towards the seal surface. A stiff flap, therefore, may make hermetic-type contact with the seal surface 24' under any orientation of the valve with very little or no pre-stress or bias towards the valve seat's seal surface.

The lack of significant predefined stress or force on the flap, to ensure that it is pressed against the seal surface during valve closure under neutral conditions, can enable the flap to open more easily during an exhalation and hence can reduce the power needed to operate the valve while breathing. Flaps of the present invention may have a stiffness of at least $5.9 \times 10^{-11}$ Newton meters squared (N-m$^2$), more preferably, at least $8.6 \times 10^{-11}$ N-m$^2$, and still more preferably, of at least $1.1 \times 10^{-10}$ N-m$^2$, when measured according to Stiffness Determination outlined below. At the upper end, the stiffness typically is less than $9 \times 10^{-5}$ N-m$^2$, more typically is less than $3.4 \times 10^{-5}$ N-m$^2$, and still more typically is less than $3.2 \times 10^{-7}$ N-m$^2$.

Figure 6:
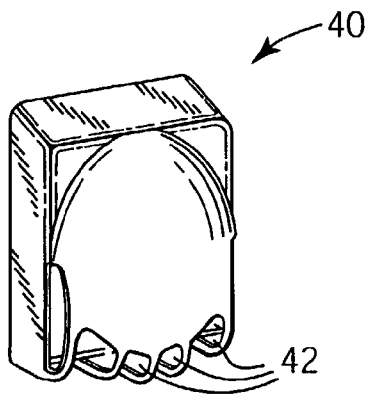
FIG. 6 is a perspective view of a valve cover 40 that may be used to protect an exhalation valve.

FIG. 6 shows a valve cover 40 that may be suitable for use in connection with the exhalation valves shown in the other figures. The valve cover 40 defines an internal chamber into which the flexible flap can move from its closed position to its open position. The valve cover 40 can protect the flexible flap from damage and can assist in directing exhaled air downward away from a wearer's eyeglasses. As shown, the valve cover 40 may possess a plurality of openings 42 to allow exhaled air to escape from the internal chamber defined by the valve cover. Air that exits the internal chamber through the openings 42 enters the exterior gas space, preferably, downwardly away from a wearer's eyewear. The valve cover can be secured to the valve seat using a variety of techniques including friction, clamping, gluing, adhesively bonding, welding, etc.

Although the present invention has been described with reference to a flapper- or cantilevered-style exhalation valve, the invention is similarly suitable for use with other kinds of valves such as the button-style valves discussed above in the Background. In addition, the present invention is likewise suitable for use in conjunction with an inhalation valve. Like an exhalation valve, an inhalation valve also is a unidirectional fluid valve that provides for fluid transfer between an exterior gas space and an interior gas space. Unlike an exhalation valve, however, an inhalation valve allows air to enter the interior of a mask body. An inhalation valve thus allows air to move from an exterior gas space to the interior gas space during an inhalation.

Inhalation valves are commonly used in conjunction with filtering face masks that have filter cartridges attached to them. The valve may be secured to either the filter cartridge or to the mask body. In any case, the inhalation valve is preferably disposed in the inhale flow stream, downstream to where the air has been filtered or otherwise has been made safe to breathe. Unlike exhalation valves, inhalation valves therefore are used primarily to preclude exhaled air from passing through the filter media. Examples of commercially available masks that include inhalation valves are the 5000™ and 6000™ Series respirators sold by the 3M Company. Examples of filtering face masks that use an inhalation valve are disclosed in U.S. Pat. No. 5,062,421 to Burns and Reischel, U.S. Pat. No. 6,216,693 to Rekow et al., and in U.S. Pat. No. 5,924,420 to Reischel et al. (see also U.S. Pat. Nos. 6,158,429, 6,055,983, and 5,579,761). While the inhalation valve could take, for example, the form of a button-style valve, alternatively, it could also be a flapper-style valve like the valve shown in FIGS. 1, 3, 4, and 5. To use the valve shown in these figures as an inhalation valve, it is mounted to the mask body in an inverted fashion so that the flexible flap 22 lifts from the seal surface 24 or 24' during an inhalation rather than during an exhalation. Inhalation by the wearer creates the necessary negative pressure inside the respirator to pull the flaps away from the valve seat into its open position. When the wearer exhales, pressure inside the respirator increases, allowing the flap to move back toward its sealed position. Inhalation valves are useful when it is desired to prevent backflow of exhaled air through a filter, preventing both the rebreathing of the exhaled air and the introduction of moisture to the filter from a wearer's breath. The flap 22 thus, would be pressed against the seal surface 24, 24' during an exhalation rather than an inhalation. An inhalation valve of the present invention could similarly improve wearer comfort by reducing the power needed to operate the inhalation valve while breathing. Exhalation and inhalation valves can be used in concert. Respirator masks that have fluid-impermeable face pieces with attached filter cartridges often use both in the same mask.

Valves of the present invention can provide extraordinary low pressure drops. The pressure drop may be determined in accordance with the Pressure Drop Test set forth below. The pressure drop across the valve at a flow rate of 85 liters per minute (L/min), may be less than about 60 Pascals (Pa), and may be less than 30 Pa, and still may be less than 10 Pa. At flow rates of 10 L/min, the inventive unidirectional fluid valve may have a pressure drop of less than 25 Pa, preferably less than 20 Pa, and more preferably less than 10 Pa. Pressure drops of about 0 to 60 Pa may be obtainable between flow rates of 10 L/min and 85 L/min using valves in accordance with the present invention. In a preferred embodiment, the pressure drop may be less than 30 Pa over flow rates of 10 L/min to 85 L/min. If a flat valve seat is employed such as shown in FIG. 5, the pressure drop may be even less than 1 Pa at flow rates of 85 L/min.

Valves of the present invention may be capable of providing good performance for leak rate, valve opening pressure drop, and pressure drop across the valve under various flow rates. These parameters may be measured using the Leak Rate Test and Pressure Drop Test described below.

The Leak Rate is a parameter that measures the ability of the valve to remain closed under neutral conditions. The Leak Rate Test is described below in detail but generally measures the amount of air that can pass through the valve at an air pressure differential of 1 inch water (249 Pa). Leak rates range from 0 to 30 cubic centimeters per minute ($cm^3$/min) at 249 Pa pressure, with lower numbers indicating better sealing. Using a filtering face mask of the present invention, leak rates that are less than or equal to 10 $cm^3$/min can be achieved. Preferably, leak rates less than 8 $cm^3$/min, more preferably less than 6 $cm^3$/min may also be achieved. Exhalation valves that have been fashioned in accordance with the present invention may demonstrate a leak rate in the range of about 3 to 6 $cm^3$/min.

The valve opening pressure drop measures the resistance to the initial lifting of the flap from the valve's seal surface. This parameter may be determined as described below in the Pressure Drop Test. Typically, the valve opening pressure drop at 10 L/min is less than 25 Pa, preferably less than 20 Pa, and more preferably less than 10 Pa when testing a valve in accordance with the Pressure Drop Test described below. Typically, the valve opening pressure drop is about 6 to 18 Pa at 10 L/min when testing a valve in accordance with the Pressure Drop Test described below.

Valves of the present invention may be very efficient in operation and may have a valve efficiency of about 25 milliwatt·gram·cubed centimeter per minute (mW·g·$cm^3$/min) or less, preferably of about 7 mW·g·$cm^3$/min or less, and still more preferably of about 1 mW·g·$cm^3$/min. Valve Efficiency may be determined in accordance with the test of the same name, described below.

TEST APPARATUS, TEST METHODS, AND

EXAMPLES

Flow Fixture

Pressure drop testing is conducted on the valve with the aid of a flow fixture. The flow fixture provides air, at specified flow rates, to the valve through an aluminum mounting plate and an affixed air plenum. The mounting plate receives and securely holds a valve seat during testing. The aluminum mounting plate has a slight recess on its top surface that received the base of valve. Centered in the recess is a 28 millimeter (mm) by 34 mm opening through which air can flow to the valve. Adhesive-faced foam material may be attached to the ledge within the recess to provide an airtight seal between the valve and the plate. Two clamps are used to capture and secure the left and right edge of the valve seat to the aluminum mount. Air is provided to the mounting plate through a hemispherical-shaped plenum. The mounting plate is affixed to the plenum at the top or apex of the hemisphere to mimic the cavity shape and volume of a respiratory mask. The hemispherical-shaped plenum is approximately 30 mm deep and has a base diameter of 80 mm. Air from a supply line is attached to the base of the plenum and is regulated to provide the desired flow through the flow fixture to the valve. For an established air flow, air pressure within the plenum is measured to determine the pressure drop over the test valve.

Pressure Drop Test

Pressure drop measurements are made on a test valve using the Flow Fixture as described above. Pressure drop across a valve was measured at flow rates of 10, 20, 30, 40, 50, 60, 70, and 85 liters per minute (L/min). To test a valve, a test specimen is mounted in the Flow Fixture so that the valve seat is horizontally oriented at its base, with the valve opening facing up. Care is taken during the valve mounting to assure that there is no air bypass between the fixture and the valve body. To calibrate the pressure gauge for a given flow rate, the flap is first removed from the valve body and the desired airflow is established. The pressure gauge is then set to zero, bringing the system to calibration. After this calibration step, the flap is repositioned on the valve body and air, at the specified flow rate, is delivered to the inlet of the valve, and the pressure at the inlet is recorded. The valve-opening pressure drop Oust before a zero-flow, flap opening onset point) is determined by measuring the pressure at the point where the flap just opens and a minimal flow is detected. Pressure drop is the difference between the inlet pressure to the valve and the ambient air.

Leak Rate Test

Leak rate testing for exhalation valves is generally as described in 42 CFR §82.204. This leak rate test is suitable for valves that have a flexible flap mounted to the valve seat. In conducting the Leak Rate Test, the valve seat is sealed between the openings of two ported air chambers. The two air chambers are configured so that pressurized air that is introduced into the lower chamber flows up through the valve into the upper chamber. The lower air chamber is equipped so that their internal pressures can be monitored during testing. An air flow gauge is attached to the outlet port of the upper chamber to determine air flow through the chamber. During testing, the valve is sealed between the two chambers and is horizontally oriented with the flap facing the lower chamber. The lower chamber is pressurized via an air line to cause a pressure differential, between the two chambers, of 249 Pa (25 mm $H_2O$; 1 inch $H_2O$). This pressure differential is maintained throughout the test procedure.

Outflow of air from the upper chamber is recorded as the leak rate of the test valve. Leak rate is reported as the flow rate, in cubic centimeters per minute, which results when an air pressure differential of 249 Pa is applied over the valve.

Valve Actuation Power

For a given valve port area (the area of the channel delivering air directly to the valve flap (in the Example, 8.55 cm$^2$)), the "actuation power" for a valve at a given flow rate can be determined for a range of flow rates by integrating the curve representing the flow rate (abscissa) in L/min and pressure drop (ordinate) in Pa, over a flow rate range of 10 to 85 L/min. Integration of the curve, represented graphically as the area under the curve, gives the power required to actuate a valve over a range of flows. The value for the integrated curve is defined as the Integrated Valve Actuation Power (IVAP) in milliwatt (mW) units.

Valve Efficiency

A valve efficiency parameter may be calculated for valves using the results from the Pressure Drop Test, Leak Rate Test, and flap mass. Valve efficiency is determined from (1) the integrated valve actuation power in mW, (2) the leak rate recorded in cm$^3$/min, and (3) the weight of the flap in grams. Valve efficiency is calculated as follows:

where:
  VE⇒valve efficiency
  IVAP⇒integrated valve actuation power (milliwatts)
  LR⇒leak rate (cubic centimeter per minute)
  w⇒flap mass (grams)
VE is expressed in units of milliwatts·gram·cubic centimeters per minute or mW·g·cm$^3$/min. Lower valve efficiency values represent better valve performance. Valves of the present invention may be able to achieve VE values of about 1 to 20 mW·g·cm$^3$/min, and more preferably less than about 10 mW·g·cm$^3$/min.

Hardness Measurement

A Nanoindentation Technique was employed to determine hardness of materials used in valve seats. The Nanoindentation Technique permitted testing of either raw material specimens, for use in valve seat applications, or valve seats as they were incorporated as part of a valve assembly. This test was carried out using a microindentation device, MTS Nano XP Micromechanical Tester available from MTS Systems Corp., Nano Instruments Innovation Center 1001 Larson Drive, Oak Ridge Tenn., 37839. Using this device, the penetration depth of a Berkovich pyramidal diamond indenter, having a 65 degree included half cone angle was measured as a function of the applied force, up to the maximum load. The nominal loading rate was 10 nanometers per second (nm/s) with a surface approach sensitivity of 40% and a spatial drift setpoint set at 0.8 nm/s maximum. Constant strain rate experiments to a depth of 5,000 nm were used for all tests with the exception of fused silica calibration standards, in which case a constant strain rate to a final load of 100,000 micro Newtons was used. Target values for the strain rate, harmonic displacement, and Poissons Ratio were 0.05 sec$^{-1}$, 45 Hertz, and 0.4, respectively. With the test specimen fixed in a holder, the target surface to be tested was located from a top-down view through a video screen of the device. The test regions were selected locally with 100× video magnification of the test apparatus to ensure that tested regions are representative of the desired sample material, that is, free of voids, inclusions, or debris. In the test procedure, one test is conducted for the fused quartz standard for each experimental run as a 'witness'. Axis alignment between the microscope optical axis and the indenter axis is checked and calibrated previous to testing by an iterative process where test indentations are made into a fused quartz standard, with error correction provided by software in the test apparatus. The test system was operated in a Continuous Stiffness Measurement (CSM) mode. Hardness, reported in Mega Pascals (MPa), is defined as the threshold contact stress for the onset of plastic flow of the specimen and is given as:
  H=Hardness
  P=Load
  A=Contact Area Stiffness Determination Stiffness, a measure of the resistance of a flap to bending, was determined using a simple model flap. The flap model was based on a geometry and configuration similar to flaps used commercially. A rectangular shape with a uniform material thickness was selected for the geometry of the model flap. Critical dimensions of the modeled flap were 2.29 cm wide and 35.56 μm thick. For a candidate material, using a model flap geometry, Stiffness can be determined as follows:
  S=Stiffness
  E=Modulus of Elasticity
  I=Moment of Inertia where:
  b=flap width of 2.29 cm
  h=flap thickness of 35.56 μm
The moment of inertia for the model flap is 8.6×10$^{-17}$ m$^4$. For a flap material like that used in Example 1, the calculated stiffness would be 3.2×10$^{-7}$ N-m$^2$.

Example 1

A valve was constructed by fitting a resilient O-ring in a valve body that was machined from steel. The O-ring was made of nitrile rubber material that had a hardness of 1.76 Mega-Pascals (MPa) as determined by the nanoindentation Hardness Measurement. The circular cross-sectional diameter of the O-ring was 1.59 mm, and it had an inside diameter of 20.46 mm. The O-ring was positioned using a metal alignment ring, integral to the steel valve body and concentric to the valve orifice. The inside diameter of the valve opening was 19.32 mm. This opening defined the flow area of the valve when assembled. The O-ring was mounted in the valve body, as shown in FIG. 5, so that no gas leakage around the outer perimeter was permitted during testing. A PET (polyethylene terephthalate) valve flap having an elastic modulus 3782 MPa and being comprised of a rectangular portion of 23.82 mm×20.26 mm (with a half circle end of 23.82 mm diameter) was fixed to the valve body so that it extended in a plane level with the top surface of the O-ring. The PET flap was 0.0356 mm thick and had a hardness of 300 MPa and stiffness of 3.2×10$^{-7}$N-m$^2$. The flap was orientated so that it could actuate in a cantilevered manner during opening and closing and was fixed along one end such that the distance from the point of fixture to the edge of the O-ring was 2.52 mm. The unsecured outer edges of the flap were aligned with the outer edge of the O-ring. To evaluate the flow performance of the valve, the assembly was attached to the Flow Fixture as described previously, and the valve was subjected to various air flows. The Leak Rate, Actuation Power, and Valve Efficiency were determined, and the results are given in Table 1 and FIG. 7.

Example 2

A valve was produced by applying a thin coating of a resilient material onto the seat of a rigid valve body of a commercially available valve assembly. The valve body used from the commercially available valve is described generally in U.S. Pat. Nos. 5,325,892 and 5,509,436 to Japuntich et al. and is a component of a valve employed on a commercially available facemask, model 8511, available from 3M Company, St. Paul, Minn. The hardness of the valve body, as received, was 52 Mpa. A valve seat of the invention was prepared, using the valve body as received, by coating the seat area of the valve body with an elastomer. The elastomer was applied to the valve body using a solution of a dissolved elastomer. The solution was prepared by blending 80 g SBS rubber, Finaprene 502, Total Fina, Plano, Tex. with 1.6 g Pigment, SL14642436, Clariant Corp., Minneapolis, Minn., 1.6 g surfactant, Atmer 1759, Unichema North America, Chicago, Ill., 248 g Toluene, and 8 g Acetone. The materials were charged into a mixing vessel and were blended in the closed vessel for three to four hours at room temperature. After blending, the mixture was allowed to sit for twelve hours. The finished blend had a solids content of 24.5% by weight. The valve seat was prepared by coating the valve body with the blended mixture. The coating was accomplished by submerging the valve body into the mixture for 1 to 2 seconds then removing the body from the mixture. The wetted valve body was then dried in a circulating air oven for twenty minutes at 82 deg C. Application of the elastomer in this manner resulted in an elastomeric valve seat thickness of approximately 231 microns and a hardness of 7 MPa. Hardness of the valve seat prepared in this manner is given in Table 1.

Comparative Example 1

Figure 7:
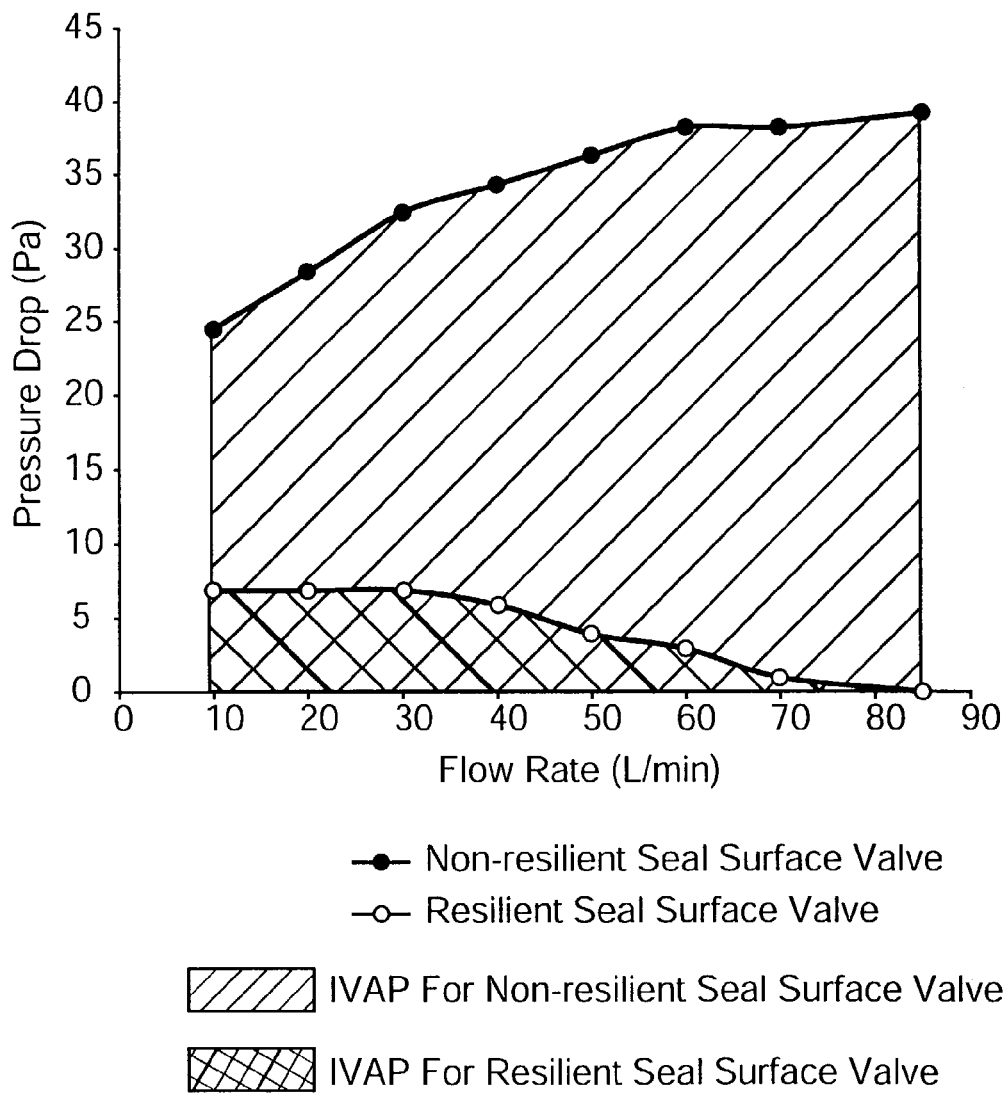
FIG. 7 is a graph that plots Pressure Drop versus Flow Rate for valves that use a resilient seal surface according to the present invention and that use a conventional seal surface in a known commercially available valve.

A valve assembly from a commercially available face mask was evaluated using the Flow Fixture, and the Leak Rate, Valve Actuation Power, and Valve Efficiency were determined with the results given in Table 1 and FIG. 7. Hardness of the valve seat surface was also determined and is reported in Table 1. The configuration of the valve is described generally in U.S. Pat. Nos. 5,325,892 and 5,509, 436 to Japuntich et al. and is used in a valve body employed on a model 8511 face mask, available from 3M Company, St. Paul, Minn. The valve body had circular orifice of 3.3 square centimeters ($cm^2$) disposed within the valve seat. The valve as received was assembled with a flap that was clamped to a flap-retaining surface that was about 4 millimeters (mm) long and that traversed the valve seat for a distance of about 25 mm. The curved seal ridge had a width of about 0.51 mm. The flexible flap remained in an abutting relationship to the seal ridge under neutral conditions, no matter how the valve was oriented. No valve cover was attached to the valve seat.

TABLE 1

| Example | Seat Hardness (GPa) | Leak Rate ($cm^3$/min) | Actuation Power (mW) | Valve Efficiency (mW · g $cm^3$/min) |
|---|---|---|---|---|
| E1 | .00176 | 4.0 | 5.2 | 0.7 |
| E2 | .007 | 6 | 27.6 | 5.6 |
| C1 | .052 | 4.9 | 43.2 | 65.8 |

The results in Table 1 show that a valve of the invention can demonstrate a good Leak Rate and an improvement in Actuation Power, and Valve Efficiency. The results also demonstrate that a valve seat of the invention can be produced with the desired resilient surface by treating a conventional valve seat with an appropriate resilient material.

This invention may take on various modifications and alterations without departing from the spirit and scope thereof. Accordingly, it is to be understood that this invention is not to be limited to the above-described but is to be controlled by the limitations set forth in the following claims and any equivalents thereof. It is also to be understood that this invention may be suitably practiced in the absence of any element not specifically disclosed herein.

What is claimed is:

1. A negative pressure filtering face mask that comprises:
    a) a mask body that is adapted to fit at least over the nose and mouth of a person to help define an interior gas space when worn; and
    b) a unidirectional exhalation valve that is secured to the mask body and that permits fluid communication between the interior gas space and an exterior gas space, the exhalation valve comprising:
        (i) a valve seat that comprises a resilient seal surface and an orifice through which exhaled air may pass to leave the interior gas space; and
        (ii) a flexible flap that is mounted to the valve seat such that the flexible flap makes contact with the resilient seal surface when the valve is in its closed position and such that the flexible flap can move away from the seal surface in response to an exhalation to allow exhaled air to pass through the orifice to ultimately enter the exterior gas space.

2. The negative pressure filtering face mask of claim 1, wherein the resilient seal surface has a hardness of less than 0.015 GPa.

3. The negative pressure filtering face mask of claim 1, wherein the resilient seal surface has a hardness less than 0.013 GPa.

4. The negative pressure filtering face mask of claim 1, wherein the resilient seal surface has a hardness less than 0.01 GPa.

5. The negative pressure filtering face mask of claim 1, wherein the resilient seal surface has a hardness of 0.006 to 0.001 GPa.

6. The negative pressure filtering face mask of claim 1, wherein the resilient seal surface is secured to the valve seat through adhering, bonding, welding, frictionally engaging, or a combination thereof.

7. The negative pressure filtering face mask of claim 1, wherein the resilient seal surface is integrally disposed on the valve seat.

8. The negative pressure filtering face mask of claim 1, wherein the majority of the valve seat is made from a relatively light-weight plastic that is molded into an integral part and that has a resilient seal surface joined to the molded one-piece body.

9. The negative pressure filtering face mask of claim 1, wherein the resilient seal surface resides on top of a seal ridge of the valve seat.

10. The negative pressure filtering face mask of claim 1, wherein the seal surface has a contact area that is curved in a concave manner where the flap makes contact with the seal surface.

11. The negative pressure filtering face mask of claim 1, wherein the unidirectional exhalation valve has, when viewed from a side elevation, a planar seal surface that is in alignment with a flap retaining surface.

12. The negative pressure filtering face mask of claim 1, wherein the flexible flap is not pressed towards the seal surface by virtue of a mechanical force or internal stress that is placed on the flexible flap.

13. The negative pressure filtering face mask of claim 1, wherein the flexible flap is not biased or forced into contact with the seal surface under neutral conditions.

14. The negative pressure filtering face mask of claim 1, wherein the flexible flap does not significantly droop away from the seal surface in an unbiased condition when the force of gravity is, per se, exerted upon the flap and the valve is oriented such that the flap is disposed below the seal surface.

15. The negative pressure filtering face mask of claim 1, wherein the flexible flap makes contact with the seal surface under any orientation of the valve under neutral conditions without having the flap biased towards the seal surface.

16. The negative pressure filtering face mask of claim 1, wherein the flexible flap makes a hermetic-type contact with the seal surface under any orientation of the valve and without prestressing or biasing the flap towards the seal surface.

17. The negative pressure filtering face mask of claim 1, wherein the flexible flap has a stiffness of at least $5.9 \times 10^{-11}$ N-m$^2$.

18. The negative pressure filtering face mask of claim 17, wherein the stiffness is less than $9.5 \times 10^{-5}$ N-m$^2$.

19. The negative pressure filtering face mask of claim 17, wherein the flexible flap has a stiffness less than $3.4 \times 10^{-5}$ N-m$^2$.

20. The negative pressure filtering face mask of claim 17, wherein the flexible flap has a stiffness less than $3.2 \times 10^{-7}$ N-m$^2$.

21. The negative pressure filtering face mask of claim 1, wherein the flexible flap has a stiffness of at least $8.6 \times 10^{-11}$ N-m$^2$.

22. The negative pressure filtering face mask of claim 1, wherein the flexible flap has a stiffness of at least $1.1 \times 10^{-10}$ N-m$^2$.

23. The negative pressure filtering face mask of claim 1, wherein the unidirectional exhalation valve is a flapper-style exhalation valve.

24. The negative pressure filtering face mask of claim 1, wherein the unidirectional exhalation valve exhibits a pressure drop of less than 60 Pa at a flow rate of 85 L/min.

25. The negative pressure filtering face mask of claim 1, wherein the unidirectional exhalation valve exhibits a pressure drop of less than 30 Pa at a flow rate of 85 L/min.

26. The negative pressure filtering face mask of claim 1, wherein the unidirectional exhalation valve exhibits a pressure drop of less than 10 Pa at a flow rate of 85 L/min.

27. The negative pressure filtering face mask of claim 1, wherein the unidirectional exhalation valve exhibits a pressure drop of less than 25 Pa at a flow rate of 10 L/min.

28. The negative pressure filtering face mask of claim 1, wherein the unidirectional exhalation valve exhibits a pressure drop of less than 20 Pa at a flow rate of 10 L/min.

29. The negative pressure filtering face mask of claim 1, wherein the unidirectional exhalation valve exhibits a pressure drop of less than 10 Pa at a flow rate of 10 L/min.

30. The negative pressure filtering face mask of claim 1, wherein the unidirectional exhalation valve exhibits pressure drop of less than 30 Pa over flow rates of 10 L/min to 85 L/min.

31. The negative pressure filtering face mask of claim 1, wherein the unidirectional exhalation valve exhibits a leak rate less than 10 cm$^3$/min.

32. The negative pressure filtering face mask of claim 1, wherein the unidirectional exhalation valve exhibits a leak rate less than 8 cm$^3$/min.

33. The negative pressure filtering face mask of claim 1, wherein, the unidirectional exhalation valve exhibits a leak rate less than 6 cm$^3$/min.

34. The negative pressure filtering face mask of claim 1, wherein the unidirectional exhalation valve exhibits a valve opening pressure drop of less than 25 Pa at 10 L/min.

35. The negative pressure filtering thee mask of claim 34, wherein the unidirectional exhalation valve exhibits a pressure drop of about 6 to 18 Pa at 10 L/min.

36. The negative pressure filtering face mask of claim 1, wherein the unidirectional exhalation valve exhibits a valve opening pressure drop of less than 20 Pa at 10 L/min.

37. The negative pressure filtering face mask of claim 1, wherein the unidirectional exhalation valve exhibits a valve opening pressure drop of less than 10 Pa at 10 L/min.

38. The negative pressure filtering face mask of claim 1, wherein the valve efficiency is about 25 mW·g·cm$^3$/min or less.

39. The negative pressure filtering face mask of claim 1, wherein the valve efficiency is about 7 mW·g·cm$^3$/min or less.

40. The negative pressure filtering face mask of claim 1, wherein the valve efficiency is about 1 mW·g·cm$^3$/min or less.

41. A negative pressure filtering face mask that comprises:
a) a mask body that is adapted to fit at least over the nose and mouth of a person to help define an interior gas space when worn; and
b) an inhalation valve that permits fluid communication between an exterior gas space and the interior gas space, the inhalation valve comprising:
  (i) a valve seat that comprises a resilient seal surface and an orifice through which air to be inhaled may pass; and
  (ii) a flexible flap that is mounted to the valve seat such that the flexible flap makes contact with the resilient seal surface when the valve is in its closed position and such that the flexible flap can move away from the resilient seal surface in response to an inhalation to allow air to be inhaled pass through the orifice to enter the interior gas space.

42. A negative pressure filtering face mask that comprises:
a) a mask body that is adapted to fit at least over the nose and mouth of a person to help define an interior gas space when worn and that comprises an integral filter layer; and
b) a unidirectional exhalation valve that is secured to the mask body and that permits fluid communication between the interior gas space and an exterior gas space, the unidirectional exhalation valve, comprising:
  (i) a valve seat that comprises a resilient seal surface and an orifice through which exhaled air may pass to leave the interior gas space; and
  (ii) a flexible flap that is mounted to the valve seat such that the flap makes contact with the resilient seal surface when the valve is in its closed position and such that the flap can move away from the seal surface in response to an exhalation to allow exhaled air to pass through the orifice to ultimately enter the exterior gas space.

43. The negative pressure filtering face mask of claim 42, wherein the resilient seal surface has a hardness of less than 0.015 GPa.

44. The negative pressure filtering face mask of claim 43, wherein the flexible flap has a stiffness of at least $5.9 \times 10^{-11}$ N-m$^2$.

45. The negative pressure filtering face mask of claim 44, wherein the exhalation valve is a flapper-style exhalation valve.

46. The negative pressure filtering face mask of claim 42, wherein the resilient seal surface has a hardness less than 0.013 GPa.

47. The negative pressure filtering face mask of claim 46, wherein the flexible flap has a stiffness of at least $8.6 \times 10^{-11}$ N-m$^2$.

48. The negative pressure filtering face mask of claim 42, wherein the resilient seal surface has a hardness less than 0.01 GPa.

49. The negative pressure filtering face mask of claim 48, wherein the flexible flap has a stiffness of at least $1.1 \times 10^{-10}$ N-m$^2$.

50. The negative pressure filtering face mask of claim 42, wherein the resilient seal surface has a hardness of 0.006 to 0.001 GPa.

51. The negative pressure filtering face mask of claim 42, wherein the resilient seal surface is secured to the valve seat through adhering, bonding, welding, frictionally engaging, or a combination thereof.

52. The negative pressure filtering face mask of claim 42, wherein the majority of the valve seat is made from a relatively light-weight plastic that is molded into an integral part and that has a resilient seal surface joined to the molded one-piece body.

53. The negative pressure filtering face mask of claim 42, wherein the resilient seal surface resides on top of a seal ridge of the valve seat.

54. The negative pressure filtering face mask of claim 42, wherein the valve efficiency is about 7 mW·g·cm$^3$/min or less.

* * * * *

UNITED STATES PATENT AND TRADEMARK OFFICE
CERTIFICATE OF CORRECTION

PATENT NO. : 7,188,622 B2
APPLICATION NO. : 10/465359
DATED : March 13, 2007
INVENTOR(S) : Philip G. Martin It is certified that error appears in the above-identified patent and that said Letters Patent is hereby corrected as shown below:

Column 12
Line 44, delete "Oust" and insert -- (just --, therefor.

Column 13
Line 25, below "follows:" insert -- VE = IVAP x LR x w --.
Line 61, delete "100x" and insert -- 100 X --, therefor.

Column 14
Line 8, below "given as:" insert -- H = P/A --.
Line 21, below "follows:" insert -- S =EI --.
Line 26, below "where:" insert -- 1 = bh$^3$/12 --.

Column 18
Line 5, in Claim 33, delete "wherein," and insert -- wherein --, therefor.
Line 10, in Claim 35, delete "thee" and insert -- face --, therefor.
Line 54, in Claim 42, delete "valve," and insert -- valve --, therefor.

Signed and Sealed this

Twenty-sixth Day of June, 2007

JON W. DUDAS
*Director of the United States Patent and Trademark Office*